(12) United States Patent
Hoyos et al.

(10) Patent No.: US 9,380,052 B2
(45) Date of Patent: *Jun. 28, 2016

(54) SYSTEM AND METHOD FOR BIOMETRIC PROTOCOL STANDARDS

(71) Applicant: Hoyos Labs Corp., San Juan, PR (US)

(72) Inventors: Hector Hoyos, New York, NY (US); Scott Streit, Baltimore, MD (US); Jason Braverman, Toronto (CA)

(73) Assignee: HOYOS LABS IP LTD., Oxford (GB)

( * ) Notice: Subject to any disclaimer, the term of this patent is extended or adjusted under 35 U.S.C. 154(b) by 44 days.

This patent is subject to a terminal disclaimer.

(21) Appl. No.: 14/587,633

(22) Filed: Dec. 31, 2014

(65) Prior Publication Data

US 2015/0188911 A1 Jul. 2, 2015

Related U.S. Application Data

(60) Provisional application No. 61/922,438, filed on Dec. 31, 2013.

(51) Int. Cl.
*H04L 29/06* (2006.01)

(52) U.S. Cl.
CPC ........ *H04L 63/0823* (2013.01); *H04L 63/0861* (2013.01)

(58) Field of Classification Search
CPC .......................... H04L 63/10; H04L 63/0832
See application file for complete search history.

(56) References Cited

U.S. PATENT DOCUMENTS

| | | | |
|---|---|---|---|
| 6,763,459 B1 | 7/2004 | Corella | |
| 7,571,485 B1 | 8/2009 | McCorkendale et al. | |
| 7,995,995 B2 | 8/2011 | Novack et al. | |
| 8,280,740 B2 | 10/2012 | Di Mambro et al. | |
| 8,380,177 B2 | 2/2013 | Laracey | |
| 8,443,202 B2 | 5/2013 | White et al. | |
| 8,457,367 B1 | 6/2013 | Sipe et al. | |
| 8,632,000 B2 | 1/2014 | Laracey | |

(Continued)

FOREIGN PATENT DOCUMENTS

WO WO 2005/069823 8/2005

OTHER PUBLICATIONS

Joon S. Park and Ravi Sandu, Role-Based Access Control on the web vol. 4, No. 1, Feb. 2001. pp. 37-71.

*Primary Examiner* — Carl Colin
*Assistant Examiner* — Ghodrat Jamshidi
(74) *Attorney, Agent, or Firm* — Leason Ellis LLP

(57) ABSTRACT

A one-time certificate is provided that enables an initial two-way secured communication session between a user computing device and a trusted server. An initial secured communication session is established by the trusted server with the user computing device after receiving the one-time certificate. The trusted server receives identification information associated with the user of the user computing device, wherein the identification information includes a representation of the user's identity that has been confirmed as a function of biometrics and further includes a representation of the user computing device. Moreover, the trusted server generates a replacement certificate that is unique to the combination of the user and the user computing device, and transmits the replacement certificate to the user computing device. Thereafter, a two-way secured communication session is established, by the trusted server, with the user computing device each time the replacement certificate is received by the trusted server.

20 Claims, 9 Drawing Sheets

(56) References Cited

U.S. PATENT DOCUMENTS

| | | |
|---|---|---|
| 9,202,028 B2 | 12/2015 | White et al. |
| 9,202,032 B2 | 12/2015 | White et al. |
| 2004/0034773 A1 | 2/2004 | Balabine et al. |
| 2004/0164848 A1 | 8/2004 | Hwang et al. |
| 2005/0086683 A1 | 4/2005 | Meyerson |
| 2006/0242701 A1 | 10/2006 | Black et al. |
| 2006/0251029 A1 | 11/2006 | Fritsch et al. |
| 2006/0293891 A1 | 12/2006 | Pathuel |
| 2007/0283154 A1 | 12/2007 | Zhang et al. |
| 2008/0034231 A1 | 2/2008 | Ginter et al. |
| 2008/0049984 A1 | 2/2008 | Poo et al. |
| 2009/0183008 A1 | 7/2009 | Jobmann |
| 2010/0014720 A1 | 1/2010 | Hoyos et al. |
| 2011/0047384 A1 | 2/2011 | Jacobs et al. |
| 2013/0042314 A1 | 2/2013 | Kelley |
| 2013/0081119 A1 | 3/2013 | Sampas |
| 2013/0227286 A1 | 8/2013 | Brisson |
| 2013/0239109 A1 | 9/2013 | Ferwerda et al. |
| 2014/0026208 A1 | 1/2014 | Coons |
| 2014/0090039 A1 | 3/2014 | Bhow |
| 2014/0115324 A1 | 4/2014 | Buer |
| 2014/0149293 A1 | 5/2014 | Laracey |
| 2014/0191028 A1 | 7/2014 | Laracey |
| 2014/0304765 A1 | 10/2014 | Nakamoto et al. |

SYSTEM AND METHOD FOR BIOMETRIC PROTOCOL STANDARDS

CROSS-REFERENCE TO RELATED APPLICATIONS

The present application is based on and claims priority to U.S. Patent Application Ser. No. 61/922,438, entitled "SYSTEM AND METHOD FOR BIOMETRIC PROTOCOL STANDARDS" filed Dec. 31, 2013, and further relates to U.S. patent application Ser. No. 14/201,438, now U.S. Pat. No. 9,208,492 entitled "SYSTEMS AND METHODS FOR BIOMETRIC AUTHENTICATION OF TRANSACTIONS" filed Mar. 7, 2014, the contents of each which is hereby incorporated by reference as if set forth expressly in its respective entirety herein.

FIELD OF THE INVENTION

The present invention relates, generally, to systems and methods for acquiring and characterizing biometric features and, in particular, to systems and methods for acquiring and characterizing facial biometric features using a mobile device for the purposes of identifying or authenticating a user.

BACKGROUND OF THE INVENTION

Information of all kinds continues to be stored and accessed remotely, such as on storage devices that are accessible over data communication networks. For example, many people and companies store and access financial information, health and medical information, goods and services information, purchase information, entertainment information, multimedia information over the Internet or other communication network. In addition to accessing information, users can effect monetary transfers (e.g., purchases, transfers, sales or the like). In a typical scenario, a user registers for access to information, and thereafter submits a user name and password to "log in" and access the information. Securing access to (and from) such information and data that is stored on a data/communication network remains a paramount concern.

SUMMARY

Accordingly, a system and method are disclosed for providing secure communication between a user computing device and a trusted server. In one or more implementations, a one-time certificate is provided, via a distributed client software application, that enables an initial two-way secured communication session between the user computing device and the trusted server. An initial secured communication session is established, by the trusted server, with the user computing device after receiving the one-time certificate. The trusted server receives, during the initial secured communication, identification information associated with the user of the user computing device, wherein the identification information includes a representation of the user's identity that has been confirmed as a function of biometrics and further includes a representation of the user computing device. Moreover, the trusted server generates a replacement certificate that is unique to the combination of the user and the user computing device, and transmits the replacement certificate to the user computing device. Thereafter, a two-way secured communication session is established, by the trusted server, with the user computing device each time the replacement certificate is received by the trusted server.

Other features and advantages of the present invention will become apparent from the following description of the invention that refers to the accompanying drawings.

BRIEF DESCRIPTION OF DRAWINGS/FIGURES

Further aspects of the present disclosure will be more readily appreciated upon review of the detailed description of its various embodiments, described below, when taken in conjunction with the accompanying drawings, of which:

DETAILED DESCRIPTION

Figure 1:
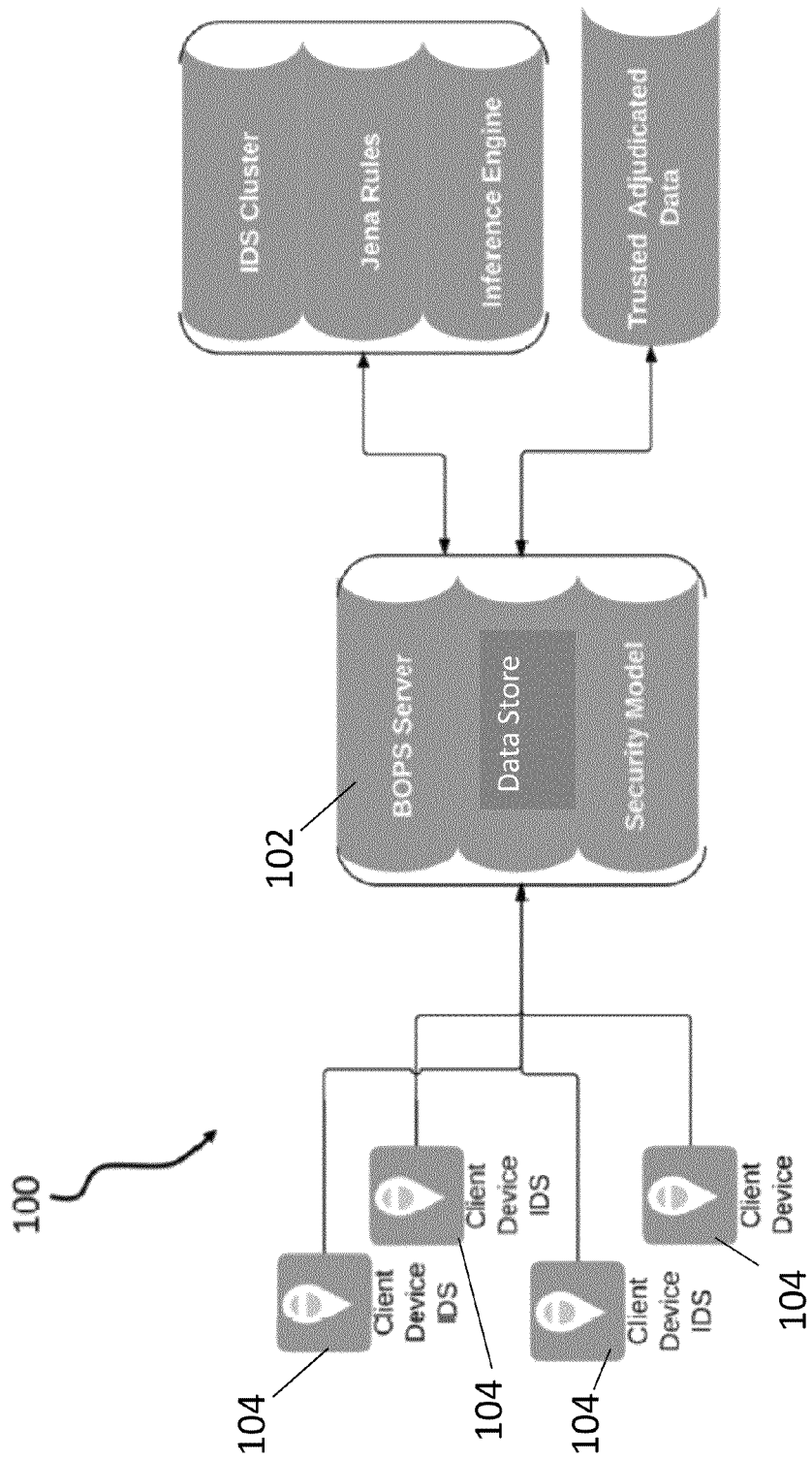
FIG. 1 is a block diagram illustrating a plurality of devices and components with certain embodiments of the application.

In accordance with one or more implementations, a new set of standards, referred to herein, generally, as Biometric Open Protocol Standards ("BOPS") is provided that, collectively or at least partially, includes a framework for authenticating users. In accordance with BOPS, authentication occurs between a user and particular service, which is allocated by a computing device referred to herein, generally, as a "BOPS server." This approach is more secure and practical than between user and an Internet website. In one or more implementations, the BOPS server allocates security details, and the user's presence is verified in an initial (referred to herein, generally, as "genesis") operation, which is described in greater detail, below.

In one or more implementations, the Biometric Open Protocol Standards provide identity assertion, role gathering, multi-level access control, assurance and auditing. In operation, the BOPS includes software running on a client device (e.g., running the ANDROID operating system, iOS, or other operating system), on a trusted BOPS Server, and on an intrusion detection system ("IDS"). The BOPS allows pluggable components to replace existing components' functionality by accepting integration into current operating environments in a short period of time.

In operation, the client/device application loads a one-time 2-way SSL key for initial communications to the server. This one-time 2-way SSL key is replaced, in function, by the subject's two way SSL key that is provided during the identity/Genesis phase.

By way of example only and for the purpose of overview and introduction, embodiments of the present application are described below, which include a system and method for recording a user's biometric features and generating an identifier representative of the user's biometric features, for example, using a mobile device such as a smartphone. The biometric identifier can be generated for the purposes of identifying/authenticating (e.g., verifying) the user according to the biometric identifier.

In one or more implementations, a system is provided that can include a cloud-based system server platform that communicates with user computing devices such as laptops, tablets and mobile devices (e.g., smartphones). As the user accesses, for example, a website which requires a secure login, a secure request is made to the system server for the user's authentication. The system server can then query the user's mobile device to capture biometric information in the form of at least images of the user's eyes, periocular region and face or any combination of the foregoing (collectively referred to as the Vitruvian region), and encode the captured Vitruvian biometric information as a Vitruvian biometric identifier. Then the user can be verified according to the Vitruvian biometric identifier. Verification can be performed, for example, by the mobile device, the system server or a combination of the foregoing by comparing the Vitruvian biometric identifier to a Vitruvian identifier generated during the user's initial enrollment with the system.

It is to be appreciated that the present application provides significant convenience for users and one or more information providers as a function of biometrics-based access management. It is recognized by the inventor that consumers generally approve of biometrics for access to and management of information that is provided remotely, such as on-line over a communication network. Biometric technologies can provide consumer with a long-awaited convenience to securely enter into "cyberspace" on the frontend.

The Biometric Open Protocol Standards provided herein protects users' digital assets and digital identities on the "backend" and can be a biometrics agnostic standard, and include an application programming interface ("API") for developers to interface therewith. For example, the present application supports different procedural and security-based measures that may have been previously in place. Accordingly, an existing security authentication process that employs biometrics can be integrated thereby precluding disruption of an existing business practice.

Moreover, in one or more implementations a BOPS communication architecture is provided that enables a 2-way Secure Socket Layer (SSL) connection over the encryption mechanism to the BOPS server, which can employ an Intrusion Detection System (IDS).

The following is an alphabetical listing of terms and corresponding definitions in accordance with one or more embodiments of the present application. An additional glossary of terms is set forth herein.

Admin Console: an online portal that facilitates to the registration and enrollment with BOPS.

Application: a unique software/system that is created using the BOPS Application Programming Interface (API) key.

BOPS Admin: a BOPS administrator, who sets up an environment and creates an Original Site Admin based on the enrollment information during the registration.

BOPS Cluster: a set of loosely or tightly connected computers, devices that communicate using BOPS.

BOPS Server: an instance of a server, such as in the client/server paradigm, which supports BOPS architecture.

BOPS IDS: an instance of the Intrusion Detection System on the private cluster that supports BOPS architecture.

Client device IDS: an instance of the Intrusion Detection System running locally on a user device.

Jena Rules: syntax and a system of machine learning rules for inferencing.

IDS Cluster: a set of loosely or tightly connected Intrusion Detection Systems that supports BOPS.

Original Site Admin: an administrator created by BOPS administrator with the privilege to create other administrators within the same organization. The Original Site Administrator can assert his/her unique identity according to the client requirements (see below, with reference to section regarding Genesis API/Client Requirements Note).

Site Admin: an application administrator who is created by The Original Site Administrator.

Trusted Adjudicated Data: data stored in BOPS with Multilevel Secure adjudication in the BOPS server.

User: a unique user, whose identity is being asserted by BOPS that may have several devices.

User Device: a single device that has biometric-driven client software.

Referring now to the drawings, in which like reference numerals refer to like elements, FIG. 1 is a simple block diagram illustrating a plurality of client devices 104 and communication with a BOPS server 102 and components associated with an example implementation. In one or more implementations, Biometric Open Protocol Standards include rules governing secure communication between a variety of client devices 104 and one or more trusted servers. As will be readily apparent to one skilled in the art, the present application provides incentive values of BOPS and provides a comprehensive guidance to the BOPS implementation. BOPS conforms to the Trusted Computer System Evaluation Criteria, frequently referred as Orange Book, section B1; to the Director of the Central Intelligence Directive 6/3 protection levels 3, 4, and 5 (PL3, PL4, PL5); and to the standards of Multiple Independent Levels of Security (MILS).

Security considerations include the security policies in place and unambiguously defined levels of security. One of the BOPS main functions is to provide authentication instead of authorization in a way such that the server does not retain the client information, but instead recognizes one client from another. As noted herein, key components of security considerations of the BOPS include identity assertion, role gathering, access control, auditing, and assurance. The present application, including via an implementation of BOPS, provides continuous protection to resources and assurance of the placement and viability of adjudication and other key features. Accountability is the mechanism that proves a service level guarantee of security.

The BOPS identity assertion provides a guarantee that named users are who they claim to be. The identity assertion implies reliance on human biometrics, however, the BOPS is an interoperable standard and can incorporate any identity asserter, or a number of asserters that provides this guarantee. The application of the Intrusion Detection System (IDS) provides active monitoring to prevent spoofing of the credentials set and blacklisting of a subject or device that makes malicious attempts.

In one or more implementations, role gathering is focused on data confidentiality and privileged access based on rules enforced by a known system. To determine whether a specific access mode is allowed, the privilege of a role can be compared to the classification of the group to determine whether the subject is authorized for confidential access. The objects structure can be defined by the access control. Role gathering occurs on the system's level or through the client/server call. The BOPS server stores role gathering information to associate a unique user with a unique device.

With regard to access control, BOPS supports access control between the named users and the named objects (e.g., files and programs). A role-based adjudication mechanism includes and allows users and administrators to specify and control sharing of objects by named individuals, by defined groups of individuals, or by both. Moreover, a discretionary access control mechanism is provided to ensure that objects are protected from unauthorized access. Further, discretionary access control provides protection at the group or individual level across a singular or group of objects. The granularity ranges from individual to group.

In one or more implementations, BOPS can enforce a mandatory access control policy over all subjects and storage objects under its control (e.g., processes, files, segments, devices). These subjects and objects can be assigned sensitivity labels, which can be a combination of hierarchical classification levels and non-hierarchical categories, and the labels can be used in the adjudication as a basis for mandatory access control decisions.

In one or more implementations, the following requirements hold for all access between subjects and objects controlled by the BOPS: a subject can read an object only if the hierarchical classification in the subject's security level is greater than or equal to the hierarchical classification in the object's security level and the non-hierarchical categories in the subject's security level include all the non-hierarchical categories in the object's security level. A subject can write an object only if the hierarchical classification in the subject's security level is less than or equal to the hierarchical classification in the object's security level and all the non-hierarchical categories in the subject's security level are included in the non-hierarchical categories in the object's security level.

Identification and authentication data should be used by BOPS to authenticate the user's identity and to ensure that the security level and authorization of subjects external to the BOPS that may be created to act on behalf of the individual user are dominated by the clearance and authorization of that user.

The present application provides for auditing and review, referred to generally herein as assurance. The BOPS can support auditing requests at the Subject/Object level or at the group level. The BOPS can use Aspect Oriented Programming (AOP) to ensure that all calls are safely written to an audit trail. Moreover, RESTFul web services and JSON interface can provide a mechanism to read the audit trail. Auditing may occur at the subject per action, the object per action or the group per action. For example, a group of users called "Accounting" may audit all writes to General Ledger; or a Chief Financial Officer may have audits for reads of the Income Statement. Furthermore, in one or more implementations JUnit tests are provided for all boundary conditions of the BOPS. The suite of tests includes testing all boundary components and conditions of the system.

As noted herein, the BOPS allow systems to meet security needs by using an API. The BOPS need not know whether the underlying system is a Relational Database Management System (RDBMS), a Search Engine or other system. The BOPS functionality offers a "point and cut" mechanism to add the appropriate security to the production systems as well as to the systems in development. The architecture is a language neutral allowing REST, JSON and Secure Socket Layers to provide the communication interface. Further, in one or more implementations the architecture is built on the servlet specification, open secure socket layers, Java, JSON, REST and Apache Solr. Another persistence engine can be supported, such as Cassandra. The tools can adhere to open standards allowing significant interoperability.

In one or more implementations, BOPS are usable through access control or added to identity assertion of already existing framework. The BOPS enables trusted processing by performing the minimum actions in the production environment and in the most cases does not require the change of any application software.

Moreover, in one or more implementations 2-way Secure Socket Layers (SSL) is provided that is built on a top of 1-way SSL, provides communication starting at the client. The initial or "genesis" communication establishes the origin of the client's identity. Thereafter, a BOPS compliant 2-way certificate is passed that the client uses for a subsequent communication in conjunction with the session oriented Identity Assertion. In one or more implementations, the client application has a pre-loaded 2-way SSL key that allows subsequent identity Genesis.

In operation, a BOPS compliant server receives 1-way SSL communication with 2-way SSL identity. Communication is conducted both 1-way SSL and 2-way SSL. The server uses a data store to take trusted identity and gather the roles for processing on behalf of the identity. Auditing ensures the appropriate artifacts for continued verification and validation of the trusted access. The Assurance occurs through the simplification and documentation of the multi-level access control mechanism. The BOPS uses an Administration Console that is available after the registration process (See below, with regard to Registration), which allows dynamic modification of Users, Groups, and Roles.

In one or more implementations, BOPS is implemented with an active intrusion detection system that provides prevention of any form of brute-forcing or denial-of-service (distributed or single DOS) attacks. The standard contains a custom rule that identifies and tracks the attempts to forge 2-way SSL certificates impersonation, a session replay, forged packets, and variety of other attempts to circumvent the BOPS server.

Figure 2:
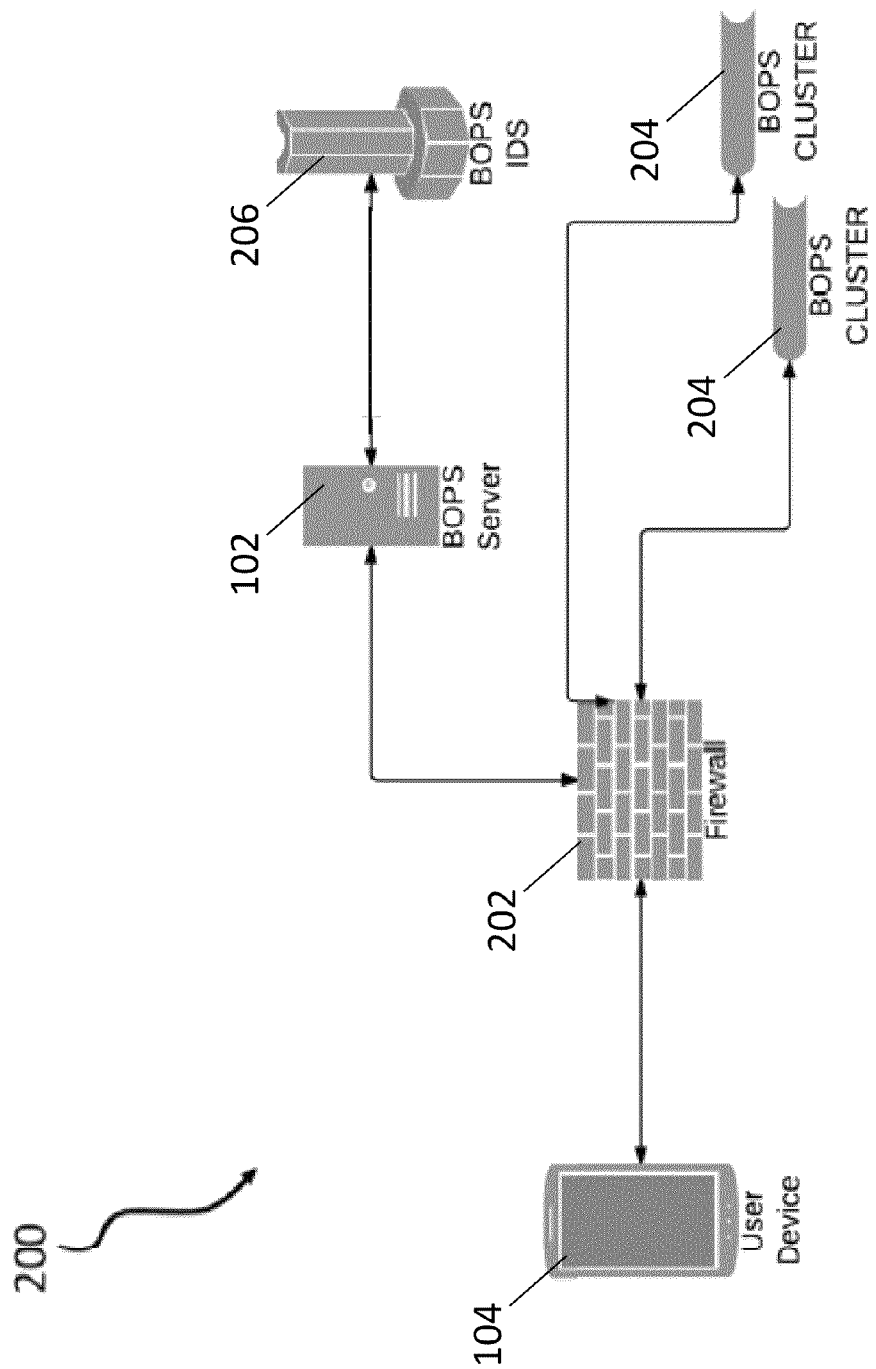
FIG. 2 is a block diagram illustrating a plurality of devices and components with certain embodiments of the application.

FIG. 2 is a block diagram illustrating example components for providing the systems and methods shown and described herein and referred, generally, as system 200. As shown in FIG. 2, user device 104 is positioned outside firewall 202, and communicates with BOPS server 102 via the BOPS application client software. Also included in FIG. 2 are BOPS clusters 204 and BOPS IDS 206. Although the implementation shown in FIG. 2 illustrates the BOPS clusters 204 separate from the BOPS server 102 and the BOPS IDS 206, one skilled in the art will recognize that the clusters 204 can comprise the BOPS server 102 and/or the BOPS IDS 206, depending on particular implementations. As noted herein, 2-way Secure Socket Layers (SSL) can be provided that is built on a top of 1-way SSL, and provides communication starting at the client.

Figure 3:
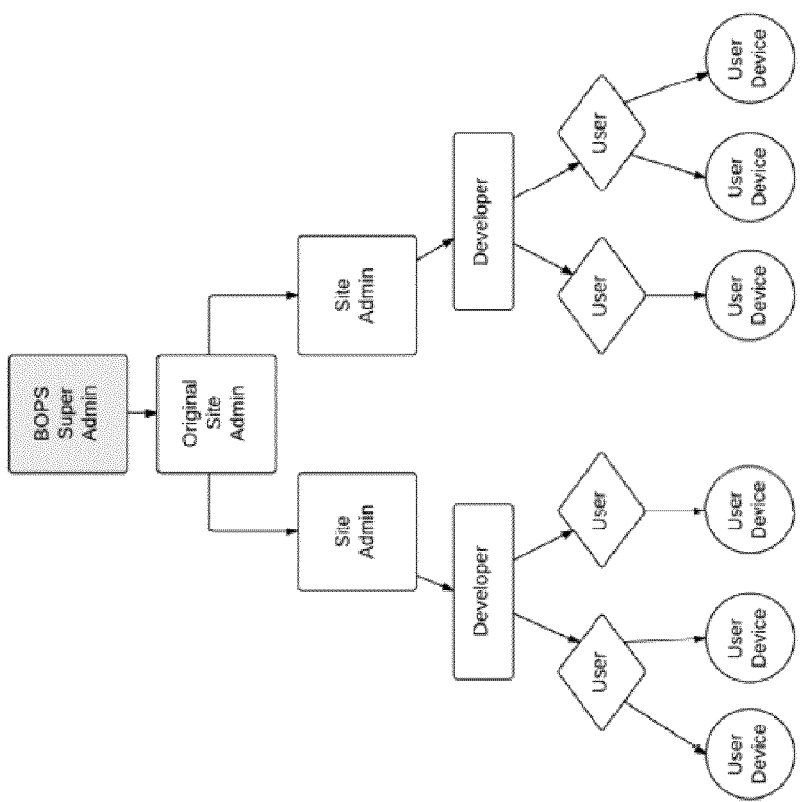
FIG. 3 illustrates an instance of roles hierarchy in accordance with the present application.

The following is a description of an example implementation of the present patent application. A registration process initiates the BOPS adoption within an organization. Before a BOPS administrator sets up an environment, the organization registers to receive an API key, for example from an Internet web site. An individual developer may apply for an API key as well. At enrollment completion, the BOPS administrator original site administrator may create additional site administrators. In the future, the enrollment information will be associated with the API key of the organization. The API registration can pertain to two domains: the enrolled original site admin and the issued API key, which is based on the enrollment information, the organization, and use case. The registration process is complete when the application commencement is agreed. Thereafter, the BOPS admin creates original Site Admin, for an organization, the original site admin may create a site admin (see FIG. 3). The steps after the registration are described below. FIG. 3 illustrates an instance of roles hierarchy in accordance with the present application.

In an example implementation, prior to the development process that utilizes the BOPS service, a developer register in a "BOPS Admin Console." By providing the application name and using, for example, a rules bases question and answer tool, to identify the developer, the BOPS establishes a new account and creates the API key, which can be identified with the application name and associated with the application. The established API key can be included in all API calls to the BOPS server. The BOPS server validates the API key. If the key is expired or invalid, the BOPS server immediately rejects the service request.

As noted herein, in one or more implementations, the communication between the application and the BOPS server is established on the top of 2-way SSL. The Genesis mechanism provides for establishing the connection. Genesis specifies how the users identify themselves to the BOPS server, so that the server can generate a private key to set up the 2-way SSL communication between the user device 104 application and the BOPS server 102. Moreover, The following example demonstrates communication between a client and a server. A request call to the BOPS server can have an API call, with the possible exception of CreateApplication, which creates the API Key. The request can originate from a client device to a secure server. The initial call receives 2-way SSL certificate and creates a user. The user can be created in a clustered persistent environment. The sums that prevent playback can be one-way encrypted using SHA1. Switching SHA1 with any suitable algorithm does not change the algorithm.

An example format of an initial call would be to the:

```
https://xyz.domain.com:8443/{BOPS_Instance_Server}/?val1=<n1>&val2=<n2>&siteId=<client>&username=<username>&password=<password>&newPassword=<newpassword>
```

For val1=<n1>, n1 is a SHA1 sum of an integer between −59 and 59 added or subtracted from the current time in ISO-8601 format. For val2=<n2>, n2 is a SHA1 sum of an integer between −59 and 59 and is greater than the plaintext value of n1. The values for username and password are client dependent and used to reach the current identity asserter. Similar mechanisms exist for SAML, LDAP, ActiveDirectory in conjunction with a variety of mechanism for Asserting Identity and Role Gathering.

The following represents the consequence of a Genesis Request:

| username | Email | val1 | val2 | Session Timeout | roles | siteId |
|---|---|---|---|---|---|---|
| scott | scott@sample.com | 5 | 40 | 3600 | Admin | businessCustomer |

The user scott has an email scott@sample.com. The first replay value in a plain text is 5 and the second is 40. The sessionTimeout exists at the sessionId, siteId pairing. For an administrator of the business customer website the sessionTimeout exists one hour.

In the greater detail the example works as follows, with the current time as 2013-12-22T17:46:03.647Z. A calculation is made to move back to the five minute interval and get 2013-12-22T17:45:00.007Z with an SHA1 sum of fa8e14cf7f80f885084ee0e3cb256182bb6a4e40

Example

```
https://xyz.domain.com:8443/{BOPS_Instance_Server}/genesisval1=fa8e14cf7f8
0f885084ee0e3cb256182bb6a4e40&val2=fa8e14cf7f80f885084ee0e3cb256182bb
6a4e40&newPassword=gasol
```

The values associated with val1 is fa8e14cf7f80f885084ee0e3cb256182bb6a4e40 is a 5 offset and for val2=fa8e14cf7f80f885084ee0e3cb256182bb6a4e40 which happens to be the same for 40. The newPassword is the password for the 2-way SSL key, which is preferably not stored on the BOPS server.

To execute this operation the BOPS Server must have the SHA1 sum for all integers between −59 and 59 to decipher the sums.

The following represents subsequent API calls. For example, at 2:18 pm Zulu time user scott uses a client device (Android phone) to create a session. The call contains deviceId for a session, as well as the following parameters:

val1=<SHA1sum of current time rolled back to the nearest 5 minute interval>&val2=<SHA1sum of current time rolled forward to the nearest 20 minuteinterval>&command, <SHA1sum of an a low level operating system such as fopen>&version=<version of command>&val3, <SHA1sum for the command file>

To prevent the replay of a previous session or a replacement the key kernel object files, the BOPS server can contain SHA1 sums for commands names and the files on a version-by-version basis. Using the BOPS protocol in a conjunction with the BOPS intrusion detection system can prevent a replay attack. The IDS updates the list of the blacklisted objects, as threats and attacks, on the further attack recognition level.

The following discussion regards an overview of an API in accordance with one or more implementations of the present application. In one or more implementations, API names are in RESTful JavaScript Object Notation (JSON) format.

With regard to identity assertion API, individual developers can apply for an API_Key for their applications that will use BOPS. Once individual developers have their own API_Keys, API calls that are made by their applications can insert this API_Key as one of parameters. The LDAP can verify the API_Key at that API level. Furthermore, application identification creates an application for use by a development team.

A discussion of an example application creation process in accordance with an example implementation is now provided. After application commencement is agreed upon, the overall BOPS admin creates a user with the special role of originalSiteAdmin. Once the original site admin exists, the first action of the person with the originalSiteAdmin role associates his/her biometrics with identity. Thereafter, actions have genesis and API. Additionally, the originalSiteAdmin role can create users of siteAdmin role. The siteAdmin role is used for additional administration work.

| Name | Definition | Input Parameters | Output Parameters | Notes |
|---|---|---|---|---|
| applicationGenesis | Create an application | Action taken by BOPS admin to create originalSiteAdmin | API_Key | |
| applicationMetadata | Given an API Key and a set of roles define the maximum roles for an application. | API Key, and superset of all application roles | Status: Success or Failure | This validates the previous CreateApplication call and if it is found, inserts or updates the maximum roles defined for Application domain. |

With regard to an example Genesis API, The genesis service is an initial setup for a user. It can work with previously stored initial identities, or can use an external axiom services for the initial identity.

| Name | Definition | Input Parameters | Output Parameters | Notes |
|---|---|---|---|---|
| identityGenesis (see the Client requirements) | Genesis service, options include, internal for a business or Axiom the next step is the user gives the password for the 2-way SSL key and the user device (software/embedded running on devices) gives a unique deviceID. | userId, email, password for the certificate, deviceId and optionally the hierarchical roles associated with the user. | A2-way SSL Key. | This places an identity into a device with the user of a 2-way SSL key. |

In one or more example implementations, there can be several defined rules for client devices to ensure identity. These rules can include: 1) the client authentication device does not require additional devices; 2) false negatives must be below a pre-defined percentage (e.g., <1%); false positives must be below a pre-defined percentage (e.g., <0.5%). Other rules can include 4) the client software blacklists itself if the user fails more than a predefined number (X) of consecutive times. Further, the client can have a client intrusion detection system capable of seeing patterns of trial and error and blacklisting itself. Applications designed for use with BOPS can include some form of Intrusion Detection, whereby the software can detect spoofing attempts and restrict access to the backend system, defined, for example, as X amount of tries, which then causes the client application to stop working for X period of time or indefinitely until the device can be properly assured that it is safe and valid. In addition, rules can include 5) Liveness, in that applications which intend to comply with BOPS include some form of Liveness detection or the ability to ensure that the user being enrolled or authenticated is an actual person and not an image or other representation of the user. For face recognition systems this can be something as simple as blink detection, the point is that some form of anti-spoofing exist to prevent false access to the system. In one or more implementations, an enterprise organization determines which use case is most suitable for a particular implementation.

In one or more implementations, role gathering is retrieved from an authoritative Role Source, e.g., Active Directory, LDAP or relational database Big Data server, or is conducted through an additional API call on a BOPS server to find the list of Roles. Roles can be gathered and stored in the BOPS server.

Role API

| Name | Definition | Input Parameters | Output Parameters |
|---|---|---|---|
| loadRoleGenesis | Given a userId; deviceId and the systems go to the well-defined role gathering source and replace the roles in BOPS. This also cancels all open sessions. All sessions must be reconstructed after this API call. Factors, the duration of each session is a security policy decision. So, how long each session lasts and how long of inactivity prior to the creation of a new session (Time To | Input userId, deviceId | The roles are loaded into server memory no output. |

Role API (continued)

| Name | Definition | Input Parameters | Output Parameters |
|------|------------|------------------|-------------------|
| | Live). The device scanning result may be sent to the BOPS server to continue the session validation. | | |

The following describes dynamic image code session construction, in accordance with one or more implementations of the present application. For example, Web Page for Dynamic Image returns sessionId. A sub-API call returns a MIME-encoded image that has the sessionId in the dynamic image. The other returns a URL of the image and the sessionId in JSON text format. At the conclusion of the session construction all Roles (labels) can be associated with the User.

| Name | Definition | Input Parameters | Output Parameters |
|------|------------|------------------|-------------------|
| sessionConstruction | This API is used to start a session that will create a sessionId to identity this this session. Besides the sessionId, the API will also return a dynamic image with embedded code information. | siteID | Returns sessionId |
| sessionStatus | This is an API to check the current session status that is associated with the given sessionId. | sessionId | The following result codes are returned: sessionNotReady, validationInProgress, userAuthenticated, userRejected, sessionTerminated, sessionExpired.sessionLogoff. userLogoff. |
| sessionTermination | Logoff | userLogoff | logoff notification sent to user. |

Continuing with dynamic image code session construction in one or more example implementations, an input device scans a dynamic image and validates the scanned sessionId with BOPS, which triggers the triple association of user, device and session. The BOPS client software validates the biometric. The biometric status is sent to the BOPS Server. In one or more implementations, the biometric data itself is not sent to the BOPS Server, to satisfy privacy concerns. Thereafter, the device scans biometric and a sessionID is created. In one or more implementations, the session status sessionId returns sessionNotReady, validationInProgress, userAuthenticated, userRejected, sessionTerminated, sessionExpired. sessionLogoff, and userLogoff. Session Termination brings a logoff notification. Once received, the session can be closed for a future activity as defined by the sessionLogoff in SessionID. SessionID creation failures can be governed by an IDS which can then take appropriate actions to terminate the sessionID creation, this may be blocking IP addresses, blacklisting domains, blacklisting users, or other means. The blacklisting has a hierarchy of restricting access to the system based on the complex machine learning rules.

Turning now to an example access control API, given sessionId, the data label and the access are allowed. In one or more implementations, the set of data in JSON format (JSONArray of JSONObjects) is a securityLabel field. The security label field is matched against the roles associated with the user through the session. If the data (JSONObject) is a subset of the roles, then the data is returned. Otherwise, the partial data of JSONObject is not returned. As the API redirects the call, the returned data becomes restricted. At the redirect API call a getJSON call is intercepted.

The following describes an example implementation in which the access control algorithm is applicable for each user at the session construction time flattened the hierarchies. Accordingly, a Manager users implies that the Manager label is both a Manager and a User, then:

If Bob is a Manager, the labels for Bob are Manager, User

If a Piece of data is Manager, the hierarchy is not flattened.

For adjudication, if the data is a subset of the users roles (groups), the adjudication allows the user to see it:

No read up, no write "Bell-LaPadula" model.

At a given point in time, the user works at the security level that is non-hierarchical. Irrespective of the number of flattened labels, the user works at one label at the time, when it comes to writes. For example, if Bob is working as a manager, he may only write data as a manager. If he is working as a user, then he may only write data as a user. This prevents the security policy from violation by "write down."

| Name | Definition | Input | Output | Notes |
|------|------------|-------|--------|-------|
| adjudicateActio n | Adjudicate an action | identity from 2- way ssl cert, comma separated set of labels | actionAllowed: read, write, update, delete | This is an example of BOPS not storing the data |

| Name | Definition | Input | Output | Notes |
|---|---|---|---|---|
| addData | addData to the BOPS Store. If data already exists, this data becomes a newer version | identity from 2- way ssl cert, data stored in tag, value pairs, comma separated set of labels for each piece of data, the labels the user is currently running as | success or failure | This is an example of BOPS storing Multi-level secure data. |
| deleteData | removeData from the BOPS store. | identity from 2- way ssl cert, the tags to remove | success if data is removed, failure may be a security exception - insufficient | This is an example of BOPS storing Multi-level secure data. |
| readData | readData from the BOPS store | identity from 2- way ssl cert, name, value pairs to read | the data in JSON format that the user may see based on security labels. | This is an example of BOPS storing Multi-level secure data. |

Turning now to one or more implementations and with regard to auditing, steps associated with Identity Assertion, Session Creation and Adjudication have an audit capability. The capability may be set for any user, groups of users or roles across any action (read/write) on any set of data. The audit can be stored and gathered RESTfully and then stored in a BOPS Server.

Turning now to administration in accordance with an example implementation, the mapping of Users to Groups and Groups to Roles and Attributes to Groups is provided by an API call. All calls require a 2-way SSL communication layer and should be conducted by the administrator role.

| API for Audit Request | | | |
|---|---|---|---|
| Name | Definition | Input | Output |
| startAudit | 2-way SSL for identity, optionally a group, action as read, write, update, delete, optionally a data object. If a data object is not specified, then we audit all data for the user | a group or a user, action to audit (read, write, i update, delete) or optionally a piece of data to apply the audit | None |
| stopAudit | 2-way SSL for identity, optionally a group, action as read, write, update, delete, optionally a data object. If a data object is act specified, then stop auditing of all data for the user. | 2-way SSL for identity, a group or a user, action to audit (read, write, i update, delete) or optionally a piece of data to apply the audit | |
| auditRecord | 2-way SSL for identity, action (read, write, update, delete), source of data. This writes an audit record. | 2-way SSL for identity, a piece of data to audit (tag, value in JSON format) arid the action that is being audited. | |

| API for Read Audit Logs | | | | |
|---|---|---|---|---|
| Name | Definition | Input | Output | Notes |
| readAudit | 2-way SSL for identity, start date in ISO8601 Format, end date in ISO8601 format, and if we have an administrator role, then the audit record is returned in JSON format. | 2-way SSL for identity, user to show audit record, datetime for start, datetime for end, data records to report (allowing wild cards) | Audit records in JSON Format | Administrator privilege to perform audit. |

Example

UPDATE_URI=https://xyz.domain.com:8443/{BOPS_Instance_Name}/JSONUpdate

To Add or Update a User

| Input Parameters | Definition |
| --- | --- |
| name | the user's name |
| id | the unique identifier for a user |
| login | the user login |
| password | the password used for a role gathering source |
| category | "User" the persistence engine |
| email | the primary email for the User |
| groups | a comma separated list of group ids for which the user is a member |
| siteId | the siteId (organization) of the user |

To Add or Update a Group

| Input Parameters | Definition |
| --- | --- |
| name | group name |
| id | the unique id of the group |
| description | description of the group in text format with spaces allowed |
| category | "Group" |
| attributes | a comma separated list of attributes that are associated with users in the group |
| roles | a comma separated list of roles in non-hierarchical format. Hierarchies are flattened |
| users | a comma separated list of users ids that are members of this group. |
| siteId | the siteId (organization) of the group |

To Add a Role

| Input Parameters | Definition |
| --- | --- |
| name | role name |
| id | the unique id of the role |
| description | description of the role in text format with spaces allowed |
| category | "Role" |
| siteId | the siteId (organization) of the role |

Moreover, reporting is supported and The administration level report is available in the auditing API.

The following is an example glossary of terms in accordance with one or more implementations of the present application.

Glossary

| | |
| --- | --- |
| AOP | Aspect Oriented Programming |
| API | Application Programming Interface |
| App | A mobile client application |
| Bell-LaPadula | The multilevel model for enforcing access control in government and military applications. A subject can only access objects at certain levels determined by his security level. |
| BOPS | Biometric Open Protocol Standards |
| CPU | Central Processing Unit |
| DAC | Discretionary Access Control |
| DOS | Denial-of-Service (attack) |
| GPU | Graphics Processing Unit |
| IDS | Intrusion Detection System |
| IDAP | Identity Assertion Platform |
| IMEI | International Mobile Equipment Identity |
| JSON | JavaScript Object Notation |
| JUnit | A testing framework for Java programming language |
| LDAP | Lightweight Directory Protocol |
| Liveness | In Computer Vision an aspect of the algorithm that defines an animated object |
| MAC | Mandatory Access Control |
| PC | A personal computer |
| RDBMS | Relational Database Management System |
| RESTful | Refers to REST Representational State Transfer, which is an architectural style. |
| SAML | Security Assertion Markup Language |
| SHA1 | Secure hash algorithm one, which was designed by the US NSA |
| SSL | Secure Socket Layers |
| TCSEC | Trusted Computer System Evaluation Criteria |
| UI | User Interface |

Figure 4:
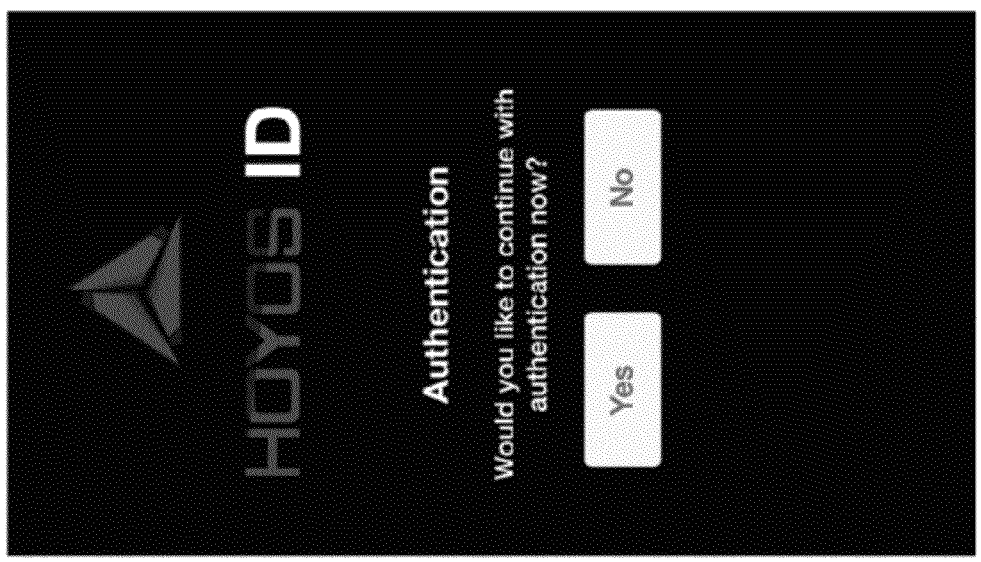
FIG. 4 is an example mobile device display screen.

The following is a description of an example implementation. To initiate the application, a user authenticates his/her face on the mobile application and is verified immediately. FIG. 4 illustrates an example mobile device display screen prompting the user to proceed with authentication. The user also can be required to specify an email address that the mobile application sends the notifications to. This way, the identity owner will receive the link to download a middleware application that synchronizes the mobile device and one or more desktop machines, where the user would like to conduct a secure authentication. This middleware, which can be installed through the standard Windows or OSX installer on every of each machine, allows managing the user's login preferences via an application on a desktop.

Figure 5:
FIG. 5 is an example interface.
Figure 6:
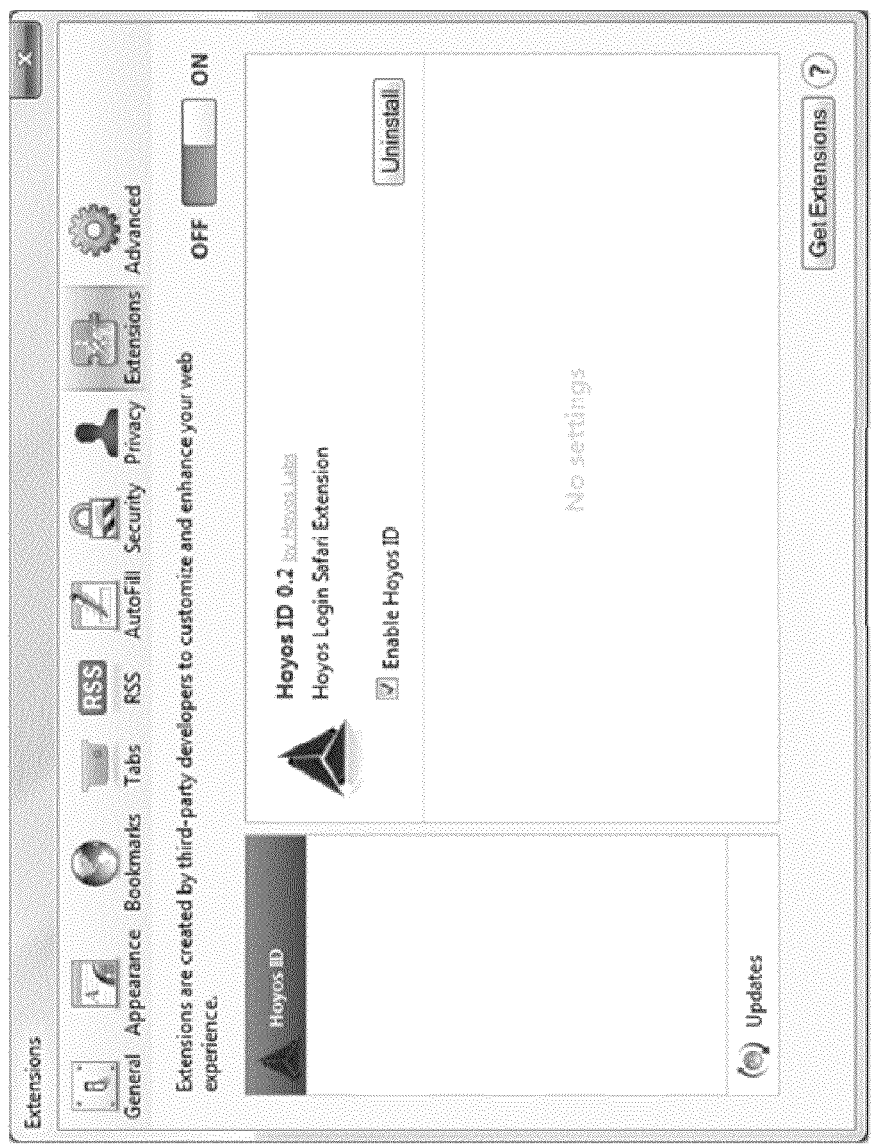
FIG. 6 illustrates an example display screen.

FIG. 5 illustrates an example interface for verifying a user. FIG. 6 illustrates an example display screen that includes configuring extensions from third-party developers to customize and enhance users' web experiences.

Figure 7:
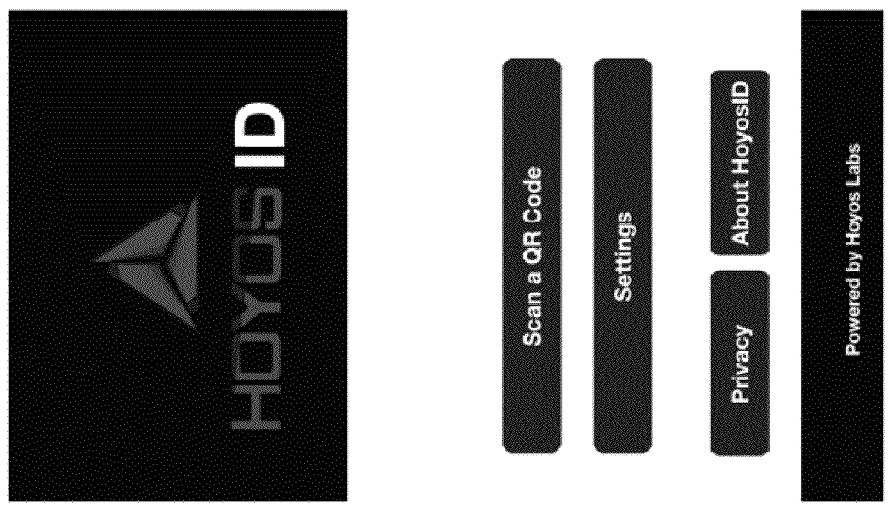
FIG. 7 is an example display screen.
Figure 8:
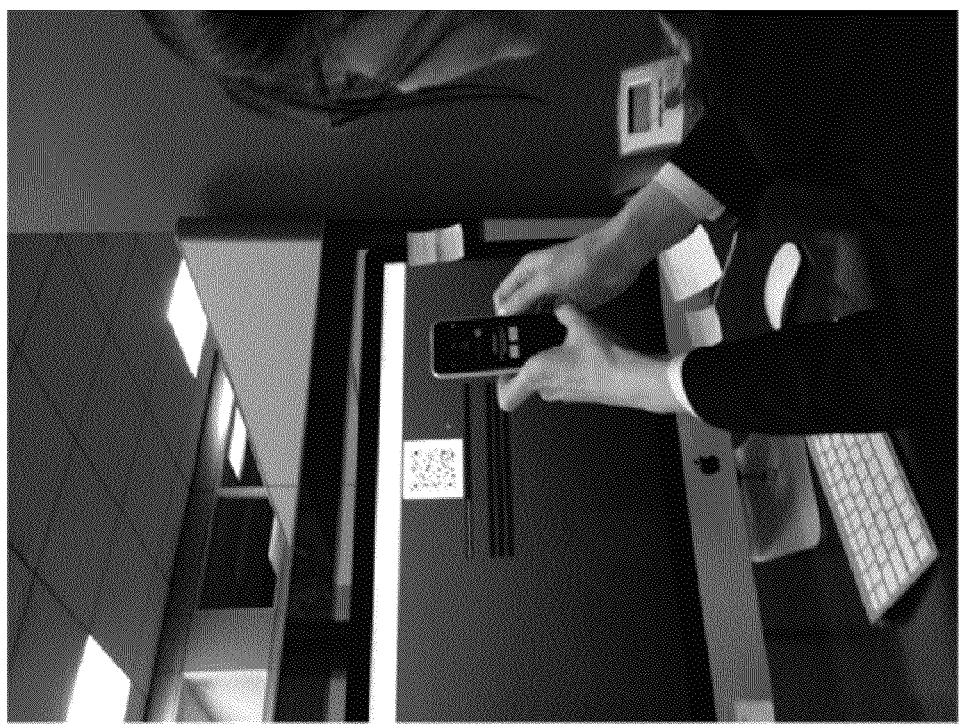
FIG. 8 illustrates an example implementation.
Figure 9:
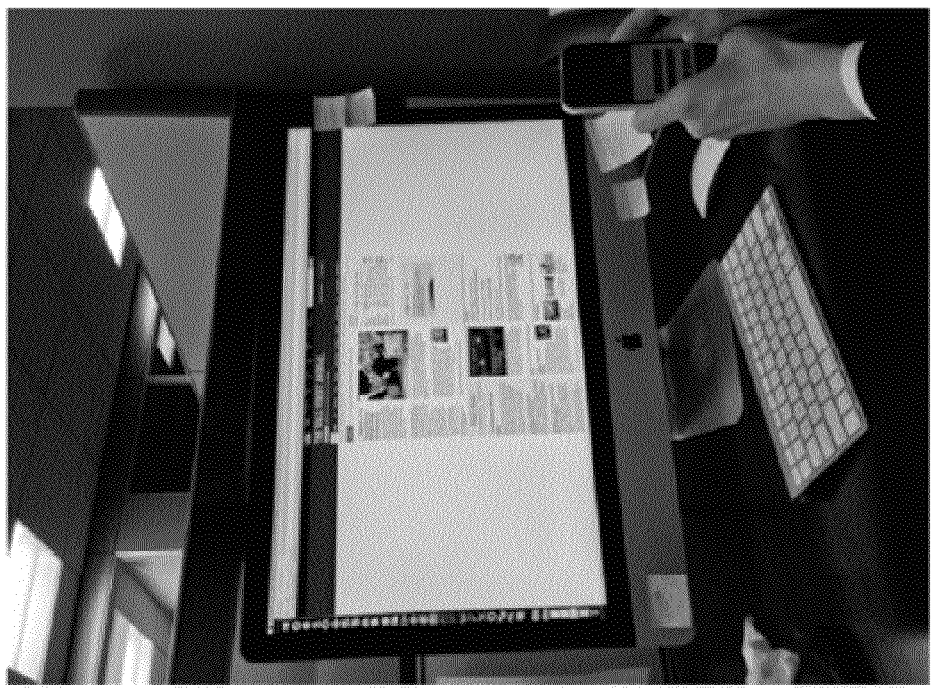
FIG. 9 illustrates an example implementation.

Once the client application is initiated, a user can access the bank account (or other website) on the computer by verifying his/her identity. That could be done in several simple steps. With reference to FIG. 7, a user is prompted to scan the QR code that appears on the screen with the phone. The user scans the QR code (e.g., as shown in FIG. 8), and, thereafter, once verified and authenticated access the content (FIG. 9). If the user's identity cannot be verified, the access to the web site will be denied. Once the identity is confirmed, the user's account will be opened in the browser.

Thus, in accordance with the systems and methods shown and described herein, the present application provides for new and verifiable authentication, access control, role gathering, assurance and auditing in connection with digital assets provided over a communication network. Following the Genesis process and binding a user's biometrics to the user's device, a two-way SSL key that has been signed by a certifying authority can be used for secure access and subsequent activity.

The present application provides for flexible implementations, including that are associated with biometric authentication, as well as for security provisions that may have been in place prior to the Genesis process. This provides for increased security without interfering with an organization's existing business methodology that regards access to digital assets. In one or more implementations, the present application adds identity assertion without disrupting an existing business model.

Furthermore, the present application provides for increased security by preventing spoofing, such as in case a two-way SSL unique identifier is "replayed" by a hacker. A hacker that is sophisticated and "roots" a smartphone, for example, in order to replace an "fopen" command with a new one, and who steals a successful handshake and attempts to return the successful handshake to fool the system would be unable to gain access to the trusted server 102.

Accordingly, the present application provides for significant improvement over known security measures by providing standards that collectively include a framework for authenticating users and enabling access to one or more digital assets thereby.

The subject matter described above is provided by way of illustration only and should not be construed as limiting. Various modifications and changes can be made to the subject matter described herein without following the example embodiments and applications illustrated and described, and without departing from the true spirit and scope of the present invention, as set forth in each and any of the following claims.

What is claimed is:

1. A method for providing secure communication between a user computing device and a trusted server, the method comprising:
   providing, via a distributed client software application, a one-time certificate that enables an initial two-way secured communication session between the user computing device and the trusted server;
   establishing, by the trusted server, an initial secured communication session with the user computing device after receiving the one-time certificate;
   receiving, by the trusted server during the initial secured communication session, identification information associated with the user of the user computing device, wherein the identification information includes a representation of the user's identity that has been confirmed as a function of biometrics and further includes a representation of the user computing device;
   generating, by the trusted server, a replacement certificate that is unique to the combination of the user and the user computing device,
   transmitting, by the trusted server, the replacement certificate to the user computing device; and
   establishing, by the trusted server, a two-way secured communication session with the user computing device each time the replacement certificate and encoded information representing that the user's identity has been verified using captured biometric information is received from the user computing device by the trusted server.

2. The method of claim 1, further comprising employing, by the trusted server, an intrusion detection system that provides active monitoring and prevents spoofing of the replacement certificate.

3. The method of claim 2, wherein the spoofing that is prevented includes replaying the replacement certificate.

4. The method of claim 1, wherein the initial two-way secured communication session and the two-way secured communication session with the user computing device each time the replacement certificate is received by the trusted server are further established as a one-way secured connection.

5. The method of claim 1, wherein the initial two-way secured communication session and the two-way secured communication session are secured via two-way secured sockets layer connections and via one-way secured sockets layer connections.

6. The method of claim 1, further comprising:
   receiving, by the trusted server from a computing device other than the user computing device, a user identifier that represents the user; and
   including the user identifier in the replacement certificate.

7. The method of claim 1, further comprising:
   providing, by the trusted server, role gathering that is defined by one or more rules for access to a digital asset; and
   providing or denying, by the trusted server, access to the digital asset by the user computing device as a function of the role gathering.

8. The method of claim 1, further comprising providing, by the trusted server, auditing of access to one or more digital assets by the user computing device.

9. The method of claim 1, wherein the representation of the user computing device includes a device identifier.

10. The method of claim 1, further comprising querying, by the trusted server, the user computing device to capture the biometric information of the user and encode the information that represents the user's identity has been verified.

11. A system for providing secure communication between a user computing device and a trusted server, the system comprising:
    at least one processor operatively coupled to one or more non-transitory processor readable media;
    wherein the one or more processor readable media includes instructions for enabling the at least one processor to:
    provide, via a distributed client software application, a one-time certificate that enables an initial two-way secured communication session between the user computing device and the trusted server;
    establish an initial secured communication session with the user computing device after receiving the one-time certificate;
    receive, during the initial secured communication session, identification information associated with the user of the user computing device, wherein the identification information includes a representation of the user's identity that has been confirmed as a function of biometrics and further includes a representation of the user computing device;
    generate a replacement certificate that is unique to the combination of the user and the user computing device,
    transmit the replacement certificate to the user computing device; and
    establish a two-way secured communication session with the user computing device each time the replacement certificate and encoded information representing that the user's identity has been verified using captured biometric information is received from the user computing device by the trusted server.

12. The system of claim 11, wherein the one or more non-transitory processor readable media further includes instructions for enabling the at least one processor to employ an intrusion detection system that provides active monitoring and prevents spoofing of the replacement certificate.

13. The system of claim 12, wherein the spoofing that is prevented includes replaying the replacement certificate.

14. The system of claim 11, wherein the one or more non-transitory processor readable media further includes instructions for enabling the at least one processor to establish a one-way secured connection each time the replacement certificate is received.

15. The system of claim 11, wherein the initial two-way secured communication session and the two-way secured communication session are secured via two-way secured sockets layer connections and via one-way secured sockets layer connections.

16. The system of claim 11, wherein the one or more processor readable media further includes instructions for enabling the at least one processor to:
- receive from a computing device other than the user computing device, a user identifier that represents the user; and
- include the user identifier in the replacement certificate.

17. The system of claim 11, wherein the one or more non-transitory processor readable media further includes instructions for enabling the at least one processor to:
- provide role gathering that is defined by one or more rules for access to a digital asset; and
- provide or deny access to the digital asset by the user computing device as a function of the role gathering.

18. The system of claim 11, wherein the one or more non-transitory processor readable media further includes instructions for enabling the at least one processor to further provide auditing of access to one or more digital assets by the user computing device.

19. The system of claim 11, wherein the representation of the user computing device includes a device identifier.

20. The system of claim 11, wherein the one or more non-transitory processor readable media further includes instructions for enabling the at least one processor to query the user computing device to capture the biometric information of the user and encode the information that represents the user's identity has been verified.

\* \* \* \* \*